US009622207B1

(12) United States Patent
Pon

(10) Patent No.: US 9,622,207 B1
(45) Date of Patent: Apr. 11, 2017

(54) WIRELESS TRANSMIT STATION SEARCH WINDOW REDUCTION

(71) Applicant: QUALCOMM Incorporated, San Diego, CA (US)

(72) Inventor: Rayman Pon, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/077,767

(22) Filed: Mar. 22, 2016

(51) Int. Cl.
*H04W 64/00* (2009.01)

(52) U.S. Cl.
CPC .................................. *H04W 64/00* (2013.01)

(58) Field of Classification Search
None
See application file for complete search history.

(56) References Cited

U.S. PATENT DOCUMENTS

| 2003/0114172 | A1 | 6/2003 | Soliman | |
|---|---|---|---|---|
| 2004/0067759 | A1 | 4/2004 | Spirito et al. | |
| 2010/0087204 | A1 | 4/2010 | Islam et al. | |
| 2011/0205122 | A1 | 8/2011 | Siomina et al. | |
| 2012/0281565 | A1* | 11/2012 | Sauer | H04W 64/00 370/252 |
| 2013/0023286 | A1 | 1/2013 | Soma et al. | |
| 2014/0213285 | A1* | 7/2014 | Sauer | H04W 64/00 455/456.1 |
| 2015/0189610 | A1* | 7/2015 | Siomina | G01S 5/021 370/280 |
| 2016/0007340 | A1* | 1/2016 | Park | H04B 7/0626 370/329 |
| 2016/0029339 | A1* | 1/2016 | Sauer | H04W 64/00 455/456.5 |

* cited by examiner

*Primary Examiner* — Diane Mizrahi
(74) *Attorney, Agent, or Firm* — Kilpatrick Townsend & Stockton, LLP

(57) ABSTRACT

Techniques disclosed herein are directed toward make use of known wireless transmit station geometry (e.g., from a cell location database/almanac) to create an optimized search window, where the size of the search window is a function of an angle between a line from the center of the region of position uncertainty of the mobile device to the location of the reference transmit station, and a line from the center of the region of position uncertainty of the mobile device to the location of the remote transmit station. Techniques can be utilized for various types of wireless transmit stations not only in cell networks, but Global Navigation Satellite Systems as well.

30 Claims, 11 Drawing Sheets

WIRELESS TRANSMIT STATION SEARCH WINDOW REDUCTION

BACKGROUND

Positioning applications for mobile phones and other mobile devices are becoming ubiquitous. Long Term Evolution (LTE) and other technologies have several methods for providing terrestrial positioning, which can be useful in environments where a Global Navigation Satellite System (GNSS) may not work with adequate accuracy, and may be required to implement E911 and/or other positioning features. Some of these methods (e.g., Observed Time Difference of Arrival (OTDOA)) depend on the mobile device obtaining a Positioning Reference Signal (PRS) or Cell-specific Reference Signal (CRS) from neighboring transmit stations (e.g., cells) within a neighbor search uncertainty window used by the mobile device. Accurate estimation of the position of the mobile device can therefore depend on a properly-evaluated search uncertainty window.

Traditional methods of establishing the size of this neighbor search uncertainty window are typically over-inclusive, setting the bounds of the uncertainty window much larger than they need to be in order to help ensure that a neighboring cell will be within the uncertainty window. This over-inclusiveness, however, can be inefficient, unnecessarily consuming processing resources, time, and power of the mobile device.

SUMMARY

Techniques disclosed herein are directed toward making use of known wireless transmit station geometry to create an optimized or custom search window, where the size of the search window is a function of an angle between a line from the center of the region of position uncertainty of the mobile device to the location of the reference transmit station, and a line from the center of the region of position uncertainty of the mobile device to the location of the neighboring transmit station. Techniques can be utilized for various types of wireless transmit stations not only in cell networks, but Global Navigation Satellite Systems as well.

According to the disclosure, an example server for providing a search window for a remote antenna, used in mobile device positioning, comprises a communication interface, a memory, and a processing unit communicatively coupled with the communication interface and the memory. The processing unit is configured to cause the server to receive, via the communication interface, information indicative of an identity of a reference antenna for a mobile device, and in response to receiving the information indicative of the identity of the reference antenna, obtain reference antenna information and remote antenna information. The processing unit is configured to cause the server to determine a size of the search window for the remote antenna, wherein the size of the search window for the remote antenna is a function of the reference antenna information and the remote antenna information, and send, via the communication interface to the mobile device, information indicative of the determined size of the search window for the remote antenna.

According to the disclosure, an example mobile device comprises a communication interface, a memory, and a processing unit communicatively coupled with the communication interface and the memory. The processing unit is configured to cause the mobile device to obtain, via the communication interface, an identity of a reference antenna, and in response to obtaining the information indicative of the identity of the reference antenna, obtain reference antenna information and remote antenna information. The processing unit is configured to cause the mobile device to determine a size of a search window for a remote antenna, wherein the size of the search window for the remote antenna is a function of the reference antenna information and the remote antenna information.

According to the disclosure, an example method of providing a search window for a remote antenna, used in mobile device positioning, comprises receiving, via a communication interface, information indicative of an identity of a reference antenna for a mobile device, and in response to receiving the information indicative of the identity of the reference antenna, obtaining reference antenna information and remote antenna information. The method further comprises determining, with a processing unit, a size of the search window for the remote antenna, wherein the size of the search window for the remote antenna is a function of the reference antenna information and the remote antenna information, and sending, via the communication interface to the mobile device, information indicative of the determined size of the search window for the remote antenna.

According to the disclosure, an example method of determining a search window for a remote antenna, used in mobile device positioning comprises obtaining, via a communication interface, an identity of a reference antenna, and in response to obtaining the information indicative of the identity of the reference antenna, obtaining reference antenna information and remote antenna information. The method further comprises determining, with a processing unit, a size of the search window for the remote antenna, wherein the size of the search window for the remote antenna is a function of the reference antenna information and the remote antenna information.

According to the disclosure, an example apparatus, comprises means for receiving information indicative of an identity of a reference antenna for a mobile device, and in response to receiving the information indicative of the identity of the reference antenna, obtaining reference antenna information and remote antenna information. The apparatus further comprises means for determining a size of the search window for the remote antenna, where the size of the search window for the remote antenna is a function of the reference antenna information and the remote antenna information, and means for sending, to the mobile device, information indicative of the determined size of the search window for the remote antenna.

According to the disclosure, an example apparatus comprises means for obtaining an identity of a reference antenna, and in response to obtaining the information indicative of the identity of the reference antenna, means for obtaining reference antenna information and remote antenna information. The apparatus further comprises means for determining a size of the search window for the remote antenna, where the size of the search window for the remote antenna is a function of the reference antenna information and the remote antenna information.

According to the disclosure, an example computer-readable medium has instructions embedded thereon for causing a computer to provide a search window for a remote antenna, used in mobile device positioning, the instructions comprising computer code for receiving information indicative of an identity of a reference antenna for a mobile device, and in response to receiving the information indicative of the identity of the reference antenna, obtaining reference antenna information and remote antenna information. The instructions further comprise computer code for determining a size of the search window for the remote antenna, wherein the size of the search window for the remote antenna is a function of the reference antenna information and the remote antenna information, and sending, to the mobile device, information indicative of the determined size of the search window for the remote antenna.

According to the disclosure, an example computer-readable medium has instructions embedded thereon for causing a computer to determine a search window for a remote antenna, used in mobile device positioning, the instructions comprising computer code for obtaining an identity of a reference antenna, and in response to obtaining the information indicative of the identity of the reference antenna, obtaining reference antenna information and remote antenna information. The instructions further comprising computer code for determining a size of the search window for the remote antenna, wherein the size of the search window for the remote antenna is a function of the reference antenna information and the remote antenna information.

Items and/or techniques described herein may provide one or more of the following capabilities, as well as other capabilities not mentioned. Techniques can provide for reduced processing time and/or resources of mobile devices and/or positioning servers. These techniques may also help prolong the battery life of mobile devices. These and other advantages and features are described in more detail in conjunction with the text below and attached figures.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

In the appended figures, similar components and/or features may have the same numerical reference label.

DETAILED DESCRIPTION

The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

References to the "cell location" used herein are meant to describe the location of the antenna (e.g., the antenna on a cell tower) corresponding to the cell. In some embodiments, a single cell tower may serve multiple cells. For example, it is currently common in the industry for a cell tower to serve three cells, each spanning substantially 120 degrees circumferentially around the cell tower, and each cell having its own antenna or group of antennas. It can be further noted that references to an "antenna" used herein may apply to any form of antenna, including an antenna array or group of antennas, depending on desired functionality. Additionally, although embodiments herein describe reference and neighbor "cells," the embodiments may additionally or alternatively include other types of wireless transmit stations (e.g., in synchronous and/or pseudo-synchronous networks), depending on desired functionality.

A wireless wide area network (WWAN) can utilize mobile telecommunication cellular network and/or other technology to enable mobile devices such as mobile phones, tablets, mobile gaming systems, personal media players, notebook computers, and similar electronic devices to transmit and receive data over a large geographical region. The position of a mobile device in such a network can be determined using various means, including Global Navigation Satellite System (GNSS) data received by the mobile device, trilateration for signals received at antennas (e.g., cell towers), and more. The determination of a mobile device has become increasingly important with the use of positioning applications by mobile devices, governmental requirements for tracking mobile devices (e.g., E911), and the like.

Some methods of terrestrial positioning, such as Observed Time Difference of Arrival (OTDOA), depend on the mobile device obtaining a Positioning Reference Signal (PRS) or Cell-specific Reference Signal (CRS) from neighboring cells within a neighbor search uncertainty window used by a mobile device to search for a neighboring cell. As explained in more detail below, techniques disclosed herein are directed toward making use of known cell geometry to optimize the size of the search window. These techniques can be implemented in a positioning system that utilizes one or more technologies to determine the terrestrial position of a mobile device.

Figure 1:
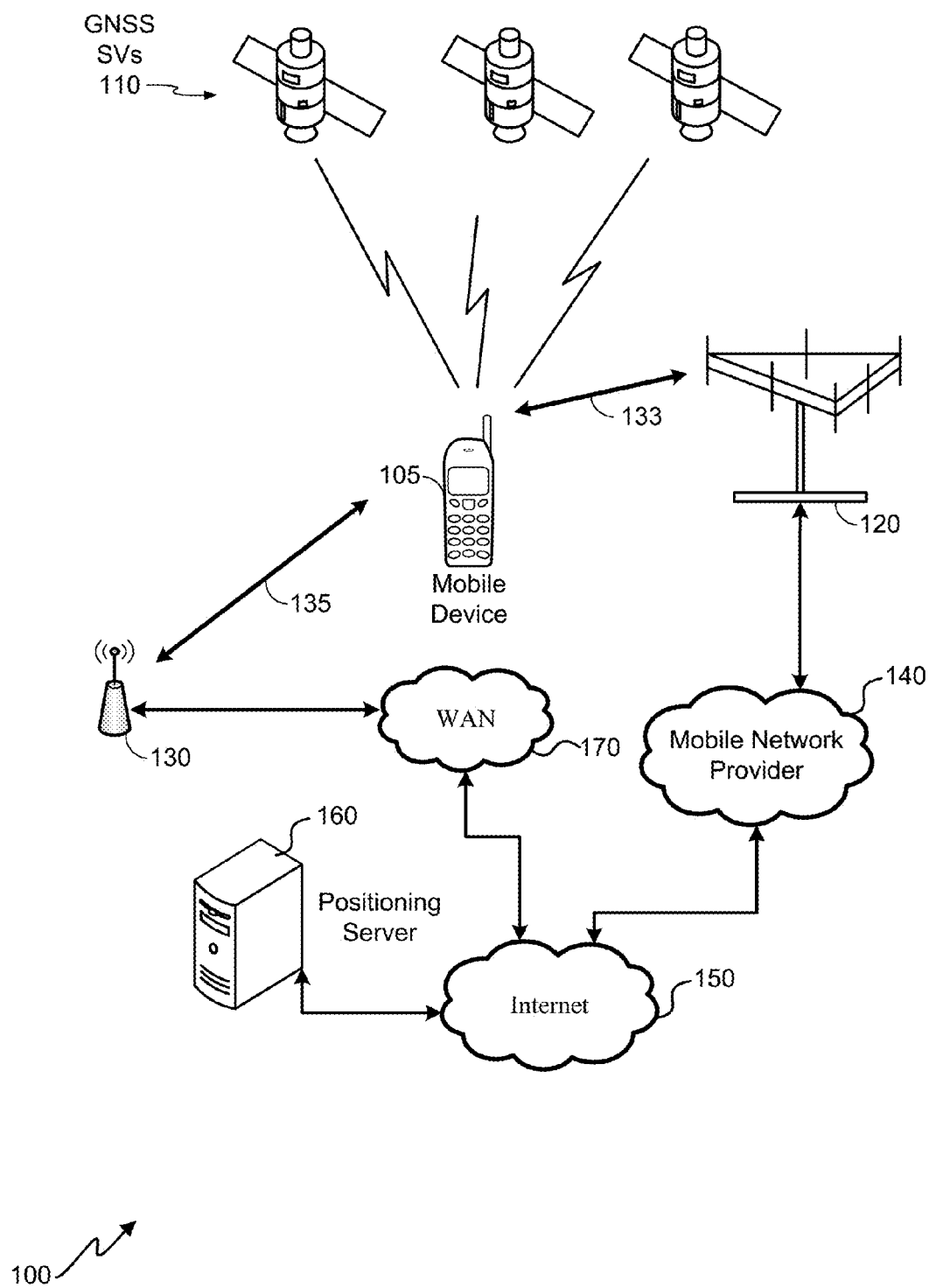
FIG. 1 is a simplified illustration of a positioning system, according to an embodiment.

FIG. 1 is a simplified illustration of a positioning system 100, according to one embodiment, which can implement the techniques described herein. Here, a mobile device 105 and/or other components of the positioning system 100 can process measurements and/or other data points to determine the position of the mobile device 105. The positioning system can include a mobile device 105, GNSS satellite vehicles (SVs) 110, cell antenna(s) 120, mobile network provider 140, access point(s) 130, positioning server 160, wireless area network (WAN) 170, and the Internet 150. It should be noted that FIG. 1 provides only a generalized illustration of various components, any or all of which may be utilized as appropriate, and each of which may be duplicated as necessary. Specifically, although only one mobile device 105 is illustrated, it will be understood that many mobile devices (e.g., hundreds, thousands, millions, etc.) may be utilized in the positioning system 100. Similarly, the positioning system 100 may include many cell antennas 120 and/or APs 130. Connections between illustrated components may include additional (intermediary) components, direct or indirect connections, and/or additional networks. Furthermore, components may be rearranged, combined, separated, substituted, and/or omitted, depending on desired functionality. A person of ordinary skill in the art will recognize many modifications to the components illustrated.

The antenna 120 is communicatively coupled to the mobile network provider 140 (e.g., a cellular network), which may be communicatively coupled with the Internet 150. The positioning server 160 can also be communicatively coupled with the Internet 150. Thus, the mobile device 105 can communicate information with the positioning server 160, for example, by accessing the Internet 150 via the antenna 120 using a first communication link 133. Additionally or alternatively, because an AP 130 and WAN 170 also may be communicatively coupled with the Internet 150, the mobile device 105 may communicate with the positioning server 160 using a second communication link 135, in some embodiments.

Figure 2A:
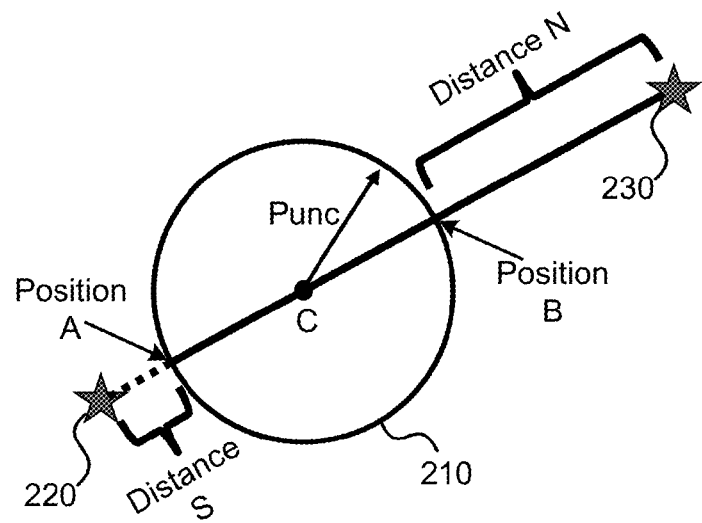
FIGS. 2A and 2B are simplified overhead diagrams that help illustrate how a calculation of a search window may be made, according to some embodiments.
Figure 2B:
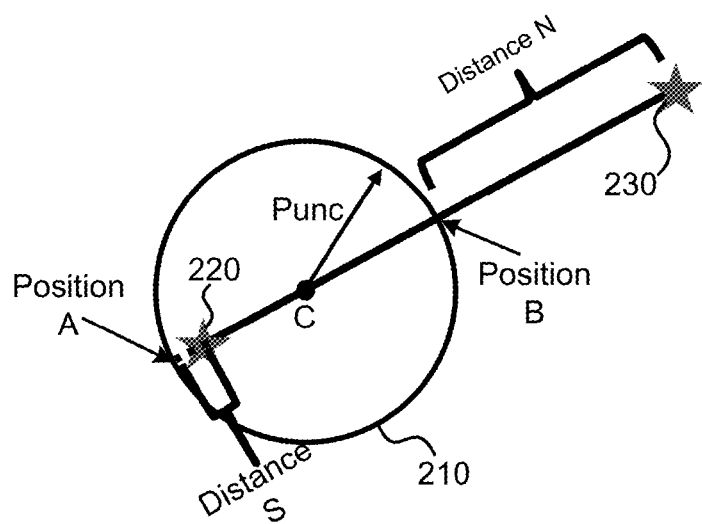

Depending on desired functionality, a location of the mobile device 105 can be determined in any of a variety of ways, by the mobile device and/or other devices in communication with the mobile device, which may be situation dependent. As noted above, positioning can be determined using OTDOA, which can depend on the mobile device obtaining a PRS or CRS from nearby antennas 120 within a neighbor search uncertainty window. Traditional techniques for establishing this uncertainty window are typically based on a calculation for a worst-case scenario. FIGS. 2A and 2B are simplified overhead diagrams that help illustrate how this calculation is made.

FIG. 2A is a simplified overhead diagram illustrating a configuration in which a serving cell 220 is outside a position uncertainty region 210 in which the mobile device is located. Here, the uncertainty region 210 is centered at point C, with a radius of Punc. Values for C and Punc may be determined by virtue of the mobile device being served by the serving cell 220, which has a known coverage region. Since absolute time is generally not known accurately, the mobile device can perform a neighbor search in reference to a "found" cell (a serving cell or otherwise). (Here, the service cell 220 and cell to search 230 may be antennas, similar to the antenna 120 of FIG. 1.)

The geometry of the configuration in FIG. 2A can be used to determine a size of a neighbor search window. Here, the serving cell 220 is at a distance S away from the perimeter of the uncertainty region 210, and the cell to search 230 is at a distance N from the perimeter of the uncertainty region. The size of the neighbor search window can then be determined by first determining the neighbor minus serving distance for a user (in possession of the mobile device) at Position A (farthest from the cell to search 230) is:

$$(N+2\times\text{Punc})-S, \quad (1)$$

and the neighbor minus serving distance for a user at Position B (closest to the cell to search 230) is:

$$N-(S+2\times\text{Punc}). \quad (2)$$

The width of the neighbor search window, then, is:

$$(N-S)-2\times\text{Punc to }(N-S)+2\times\text{Punc} \quad (3)$$

In taking the difference between these two values, N and S terms cancel out, leaving 4×Punc as the worst-case width of the search window where the serving cell is outside a position uncertainty region 210.

FIG. 2B is a simplified overhead diagram similar to FIG. 2A. Here, however, a configuration is illustrated in which a serving cell 220 is inside a position uncertainty region 210 of the mobile device. Again, values for C and Punc may be determined by virtue of the mobile device being served by the serving cell 220, and the geometry of the configuration can be used to determine a size of a neighbor search window. Here, the cell to search 230 is again at a distance N from the perimeter of the uncertainty region, but now the serving cell 220 is at a distance S inside the perimeter of the uncertainty region 210. The size of the neighbor search window can then be determined by first determining the neighbor minus serving distance for a user at Position A is:

$$(N+2\times\text{Punc})-S, \quad (4)$$

and the neighbor minus Serving distance for a user at Position B is:

$$N-(2\times\text{Punc}-S). \quad (5)$$

The width of the neighbor search window, then, is:

$$(N+S)-2\times\text{Punc to }(N+S)+2\times\text{Punc}-2S \quad (6)$$

This simplifies to 4× Punc−2S, which further simplifies to −4×Punc for a small S (which ensures the largest search window for the worst-case search). Thus, the worst-case width of the search window where the serving cell is inside a position uncertainty region 210 is approximately the same as the worst-case width of the search window where the serving cell is outside the position uncertainty region 210: 4×Punc.

With this in mind, traditional techniques for determining the size of the search window for the neighbor cell would typically fixe the size at 4×Punc to ensure that the neighbor cell is within the neighbor search window. In contrast, techniques provided herein determine the size of the neighbor search window by making use of known cell geometry (e.g., from a cell location database/almanac) of the serving cell 220 and cell to search 230 to reduce the size of the search window.

According to some embodiments, the search window reduction can be based on the following equation:

$$OD = P\left\{\sqrt{\left(\frac{L}{P} - \cos(\alpha - A)\right)^2 + \sin^2(\alpha - A)} - \left(\frac{L}{P}\right)\right\}. \quad (7)$$

Here, for simplicity, Punc is further abbreviated as P. Additionally L=N+P (the distance from the cell to be searched 230 to the center C of the uncertainty region 210). D (not shown) is the distance from a cell to be searched 230 to the perimeter of the uncertainty region 210 with respect to angle (α−A), where A is the angle of the cell to be searched 230 (e.g., a neighbor cell) with respect to a reference frame. (As shown in embodiments below, A may be the angle between the line from the cell to search 230 to the center C of the uncertainty region 210 and the line from the center C of the uncertainty region 210 to the service cell 220.) Finally, OD is the Offset Distance from the nominal to the center C of the uncertainty region 210 (D-L).

The ratio of OD/P can then be computed for the cell to be searched (neighbor cell), for all (or a set of) values of a, starting with angle A as the zero reference point for a specified L/P. (The value L/P is known as the "LOP" or "LOP ratio," and referred to as such herein below). Similarly, the ratio of OD/P can also be calculated for the serving cell for the same values of a.

The determination of the reduced window size can then be made by taking the difference between the sets of OD/P values. In other words, the OD/P values for the serving cell for a set of values of a can be subtracted from the OD/P values for the neighbor cell for the same values of a as follows:

$$Diff(\alpha) = \frac{OD}{P}(\text{neighbor cell}) - \frac{OD}{P}(\text{serving cell}) \quad (8)$$

or $$Diff(\alpha) = \left\{ \sqrt{\left(\left(\frac{L}{P}\right)_n - \cos(\alpha)\right)^2 + \sin^2(\alpha)} - \left(\frac{L}{P}\right)_n \right\} - \left\{ \sqrt{\left(\left(\frac{L}{P}\right)_s - \cos(\alpha - A)\right)^2 + \sin^2(\alpha - A)} - \left(\frac{L}{P}\right)_s \right\} \quad (9)$$

for $\alpha = [0,360]$, where $(L/P)_n$ is the L/P if the neighbor cell, and $(L/P)_s$ is the L/P of the serving cell. The range of the resulting values after the subtraction determines the size of the search window (which will, in most cases, be smaller than 4×Punc).

FIGS. 3A-4B provide two examples to help illustrate this determination.

Figure 3B:
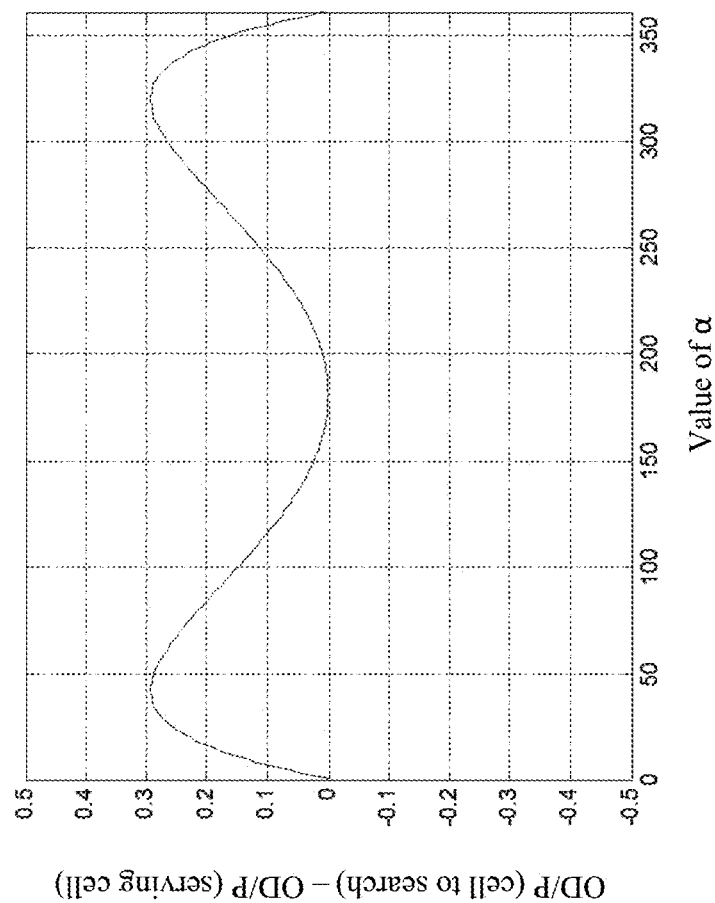
FIGS. 3A and 3B are a simplified overhead diagram and a corresponding graph, respectively, illustrating one example of how a reduced or custom search window may be calculated, according to some embodiments.
Figure 3A:
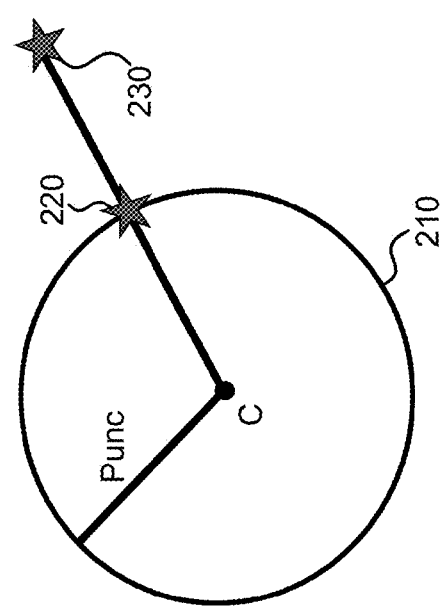

FIG. 3A is a simplified overhead diagram similar to those shown in FIGS. 2A-2B. In this configuration, however, the serving cell 220 is located at the perimeter of the uncertainty region 210 on the same side as the cell to search 230. Here, the LOP (L/P) of the serving cell is 1, and the LOP of the cell to search is 2. Furthermore, the angle A between the line from the cell to search 230 to the center C of the uncertainty region 210 and the line from the center C of the uncertainty region 210 to the serving cell 220 is 0 degrees.

FIG. 3B is a graph illustrating the OD/P values for the serving cell 220 subtracted from the OD/P values for the cell to search 230 for values of a ranging from 0 to 360 degrees. (It can be noted that embodiments may reverse this subtraction: subtracting the OD/P values for the cell to search 230 from the OD/P values for the serving cell 220, as long as the search criteria of windows and offsets takes this difference into account.) Here, the difference in the minimum value and maximum value is approximately 0.3. Accordingly, the size of the search window for the cell to search 230 is 0.3×Punc.

Figure 4B:
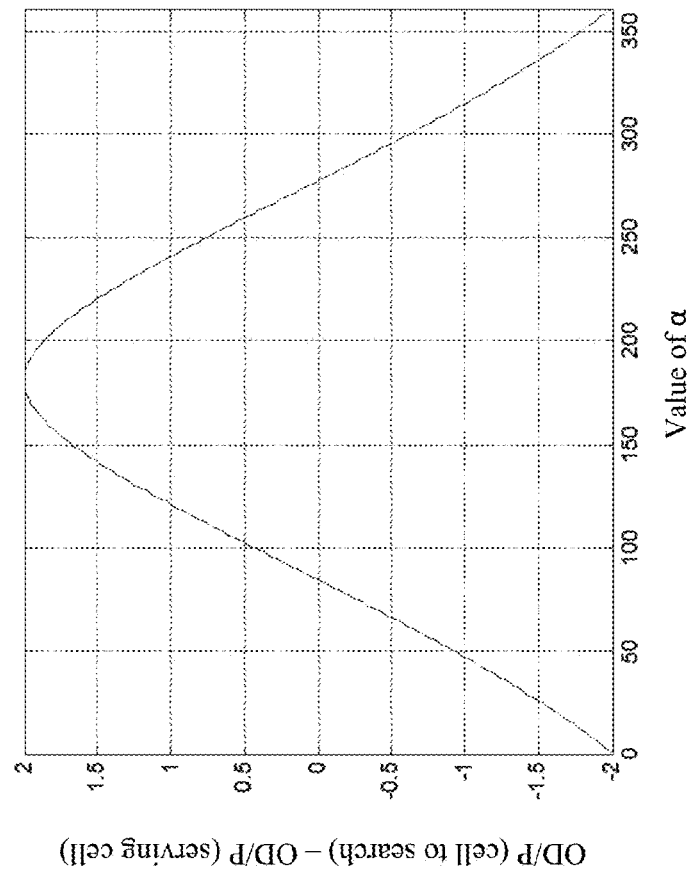
FIGS. 4A and 4B are a simplified overhead diagram and a corresponding graph, respectively, illustrating another example of how a reduced or custom search window may be calculated, according to some embodiments.
Figure 4A:
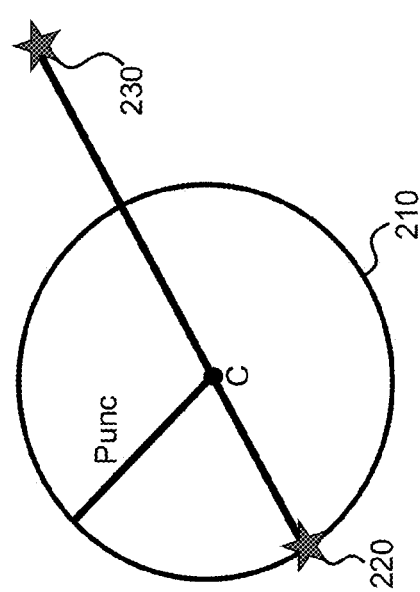

FIGS. 4A and 4B show a second example with a different configuration. In the configuration shown in FIG. 4A, the serving cell 220 is located at the perimeter of the uncertainty region 210 on the opposite side as the cell to search 230. The LOP of the serving cell 220 is 1, the LOP of the cell to search 230 is 2, and the angle A between the line from the cell to search 230 to the center of the uncertainty region 210 and the line from the center of the uncertainty region 210 to the service cell 220 is 180 degrees.

FIG. 4B is a graph illustrating the corresponding OD/P values for the serving cell subtracted from the OD/P values for the cell to search for values of a ranging from 0 to 360 degrees. Here, the difference in the minimum value and maximum value is approximately 4. Thus, the size of the search window for the cell to search is the same as the worst-case scenario: 4× Punc.

In most cases, however, the search window will be reduced to a value of less than the worst-case scenario value. As such, employing the techniques herein can have various benefits. A reduced window, for example, can lead to a reduced power and processing resources, and/or enable a mobile device to search more candidates with the same capacity. A reduced search window can also reduce false alarms (where a search leads to a potentially incorrect result) and/or improved sensitivity.

Depending on desired functionality, additional steps may be taking to increase the efficiency in employing the techniques herein. Additionally or alternatively, the total number of calculations may be reduced in any number of additional ways, such as only calculating OD/P values where a is a whole number, an even/odd number, a multiple of 3 (4, 5, etc.), spaced such that the error from actual does not exceed a certain value, and the like. This level of granularity in the calculations can be increased or decreased as desired.

In some embodiments, these calculations may be done on-the-fly by a mobile device or server. In some embodiments, OD/P can be calculated for various values of LOP and stored in memory (e.g., a database), enabling a server or mobile device to simply lookup these values rather than calculate them. Since the OD/P curve asymptotes to a sinusoidal wave for large LOP (for example, LOP values of 10 or 20), the number of LOP values can be limited. Since the angle A (the angle between a line from the cell to search to the center of the uncertainty region and a line from the center of the uncertainty region to the serving cell) plays a dominant role in the magnitude of the uncertainty window, some embodiments may simply store values for search window sizes as a function of this angle. Additionally or alternatively, embodiments may use a table that includes stored values for LOPs (for serving cell and cell to search) at various angles.

It can be noted that, although embodiments described above use the terms "serving cell," "neighboring cell," "neighbor uncertainty window," and the like, the techniques disclosed herein can be extended to embodiments in which a reference cell may not necessarily be a serving cell (or cell via which the mobile device may be communicatively linked to a cellular or other data network), and a cell to search may be any remote cell not necessarily "neighboring" the reference cell.

It can be further noted that, although embodiments described above utilize cells in a cellular network, such as an LTE network, embodiments are not so limited. The techniques described herein can further be utilized in other instances in which a similar search window may need to be determined for a wireless transmit station. Such instances include, for example, reducing search uncertainty for GNSS SVs, given one or more reference transmit stations (e.g., cells of a cellular (e.g., LTE, CDMA, or WCDMA) network).

Figure 5:
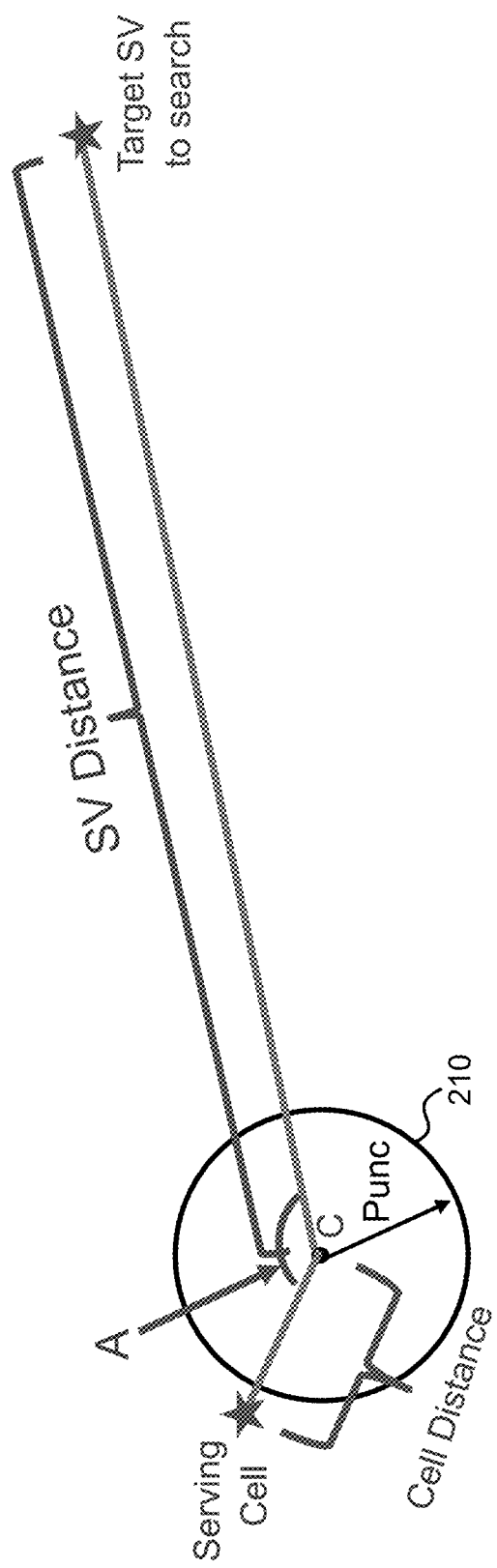
FIG. 5 is a simplified overhead diagram provided to help illustrate how techniques herein may be utilized to aid in a search for GNSS SVs.

FIG. 5 is a simplified overhead diagram provided to help illustrate how the techniques above may be utilized to aid in a search for GNSS SVs. As with previous figures, FIG. 5 illustrates an uncertainty region 210 of a mobile device centered at point C, with a radius of Punc. The equation (7) above can be applied here to compute OD/P for the serving cell and the SV to search. With regard to the SV to search, A is the angle of the SV to search with respect to a reference frame, and L is the distance from the center of the uncertainty region to the SV to search. OD/P for the SV to search is $$\frac{OD}{P} = \left[ \sqrt{\left(\frac{L}{P} - \cos(\alpha - A)\right)^2 + \sin^2(\alpha - A)} - \left(\frac{L}{P}\right) \right] \cos(SV_{elev}) \quad (10)$$

where $SV_{elev}$ is the SV elevation. This equation can undergo simplification due to the large SV distance, which results in a large L/P value. In particular, the first squared term under the square root dominates the second squared term (which is limited to a value of 1 maximum) for large L/P values. The square root of this dominant term is $L/P-\cos(\alpha-A)$, which, after subtracting L/P outside the square root (and inside the square bracket) in equation 10, results in $-\cos(\alpha-A)$. Thus, equation (10) can be approximated as:

$$\frac{OD}{P} = -\cos(\alpha - A)\cos(SV_{elev}). \quad (11)$$

The corresponding Diff($\alpha$) then becomes:

$$\left\{ \sqrt{\left(\frac{L}{P} - \cos(\alpha)\right)^2 + \sin^2(\alpha)} - \left(\frac{L}{P}\right) \right\} + \cos(\alpha - A)\cos(SV_{elev}). \quad (12)$$

It can be noted that, to help reduce the processing requirements (MIPS) of calculating equations (7), (9), (10), and (12), the term:

$$\sqrt{\left(\frac{L}{P} - \cos(x)\right)^2 + \sin^2(x)} \quad (13)$$

in those equations (where x represents either $\alpha$ or $\alpha-A$, as the case may be) can be replaced by the following identical term:

$$\sqrt{\left(\frac{L}{P}\right)^2 - 2\left(\frac{L}{P}\right)\cos(x) + 1}. \quad (14)$$

The term (14) uses less MIPS than the term (13) because it has only one cosine to determine, rather than a cosine and a sine.

Figure 6:
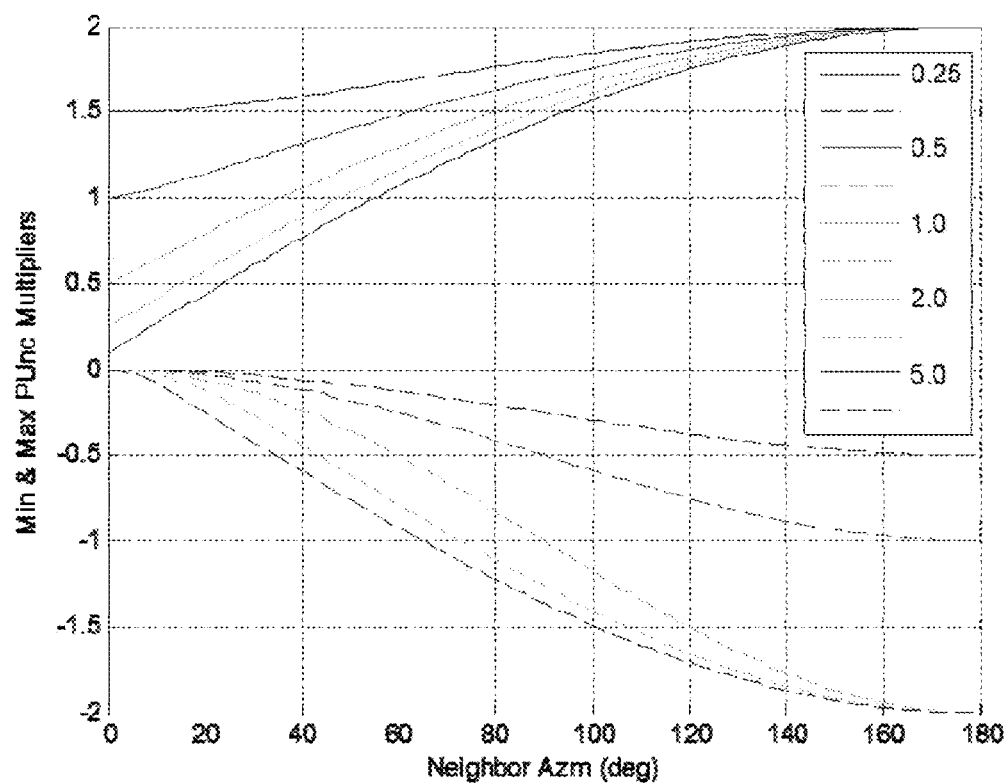
FIG. 6 is a diagram illustrating corresponding calculations based on the configuration illustrated in FIG. 5.

FIG. 6 is a graph slightly different from the graphs of FIGS. 3B and 4B in that the values are shown as a function of the cell to search relative angle A from 0 to 180, rather than values of α from 0 to 360. Here solid lines (above 0) represent maximum value Punc multipliers for different values of LOP for the reference cell (ranging from 0.25 to 5.0). As can be seen, maximum values converge to 2 at 180 degrees. Dashed lines (below 0) represent corresponding minimum Punc multipliers for different values of LOP, which converge to values ranging from −0.5 to −2.0 at 180 degrees. (It should be noted that the L/P value for the SV to search is large and absent from the simplified equation, so is not a parameter in the graph.) The search window can be found by first finding the minimum and maximum curves associated with a given LOP value for the serving cell. Then, for the given angle A between the serving cell and the target SV, finding the minimum to maximum values. This determines the search window about the nominal expected value to search for the SV.

Figure 7:
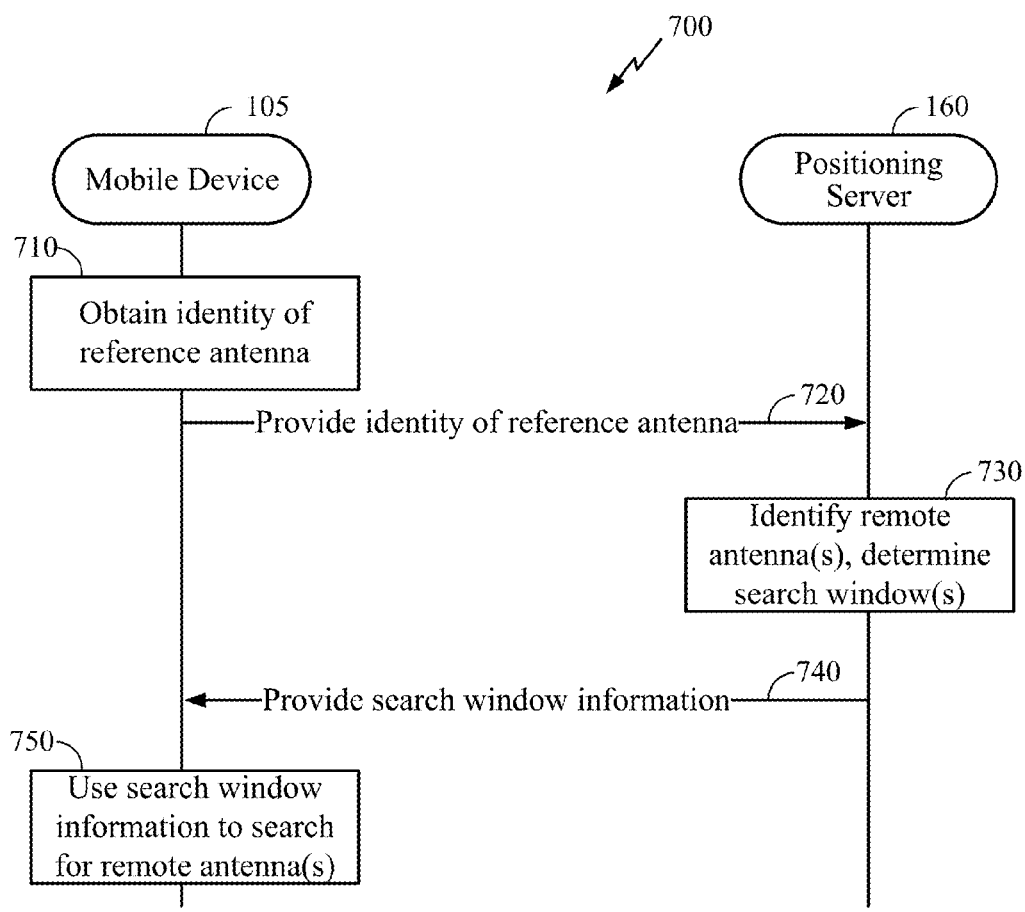
FIG. 7 is a call flow diagram that illustrates the information exchange between a positioning server and a mobile device to help reduce the size of a search window, according to an embodiment.

As previously discussed, and aspects of the techniques described herein can be implemented by the mobile device or the server, depending on desired functionality. In some embodiments, for example, the mobile device may perform the calculation of the search window width. In some embodiments, the server may perform these calculations and provide search window width (or other search window information) to the mobile device. FIG. 7 is a call flow diagram of such an embodiment using server calculations, illustrating an example interaction between a mobile device and a positioning server.

FIG. 7 is a call flow diagram 700 that illustrates the information exchange between a positioning server 160 and a mobile device 105 to help reduce the size of a search window (e.g., for PRS or CRS signals of a cell to search), according to an embodiment. Here, the mobile device 105 and positioning server 160 are in reference to corresponding elements of the positioning system 100 of FIG. 1. It will be understood, however, that embodiments may employ other types of devices (server and/or mobile) in other types of systems. It will be understood, however, that alternative embodiments may communicate similar information between a mobile device and a server in a different manner or sequence.

At action 710, the mobile device 105 obtains an identity of a reference antenna. In an LTE network, for example, this may be a base station ID (BSID) or similar identifier. In some embodiments, as indicated above, the reference antenna may be the serving cell, in which case and identifier can be provided to the mobile device in a handshake or similar process when the cell becomes the serving cell. Alternatively, a cell or antenna other than the serving cell may serve as the reference antenna where the antenna may be identified and its location determined. At action 720, the mobile device 105 provides the identity of the reference antenna to the positioning server 160.

With the identity of the reference antenna, the positioning server 160 can, at action 730, identify one or more remote antennas and determine a corresponding search window for each of the one or more antennas. This can be done, for example, by retrieving information stored on a database, such as the location of the reference antenna and the one or more remote antennas, as well as the information about the mobile position expected center and uncertainty given the serving cell or other information from the mobile device. As indicated above, this location information (also referred to herein as reference antenna information and remote antenna information) may be used in calculations to determine a size of the search window corresponding to a remote antenna. In some embodiments, these calculations may be done on the fly. In some embodiments all or a portion of these calculations may also be stored in a database or other data structure to reduce the amount of calculations required in real time.

At action 740, the positioning server 160 provides the mobile device 105 with search window information. The search window information can, for example, include information regarding the center of the search window and its width. With this information, the mobile device 105 can, at action 750, conduct the search using the search window.

Depending on desired functionality, embodiments may make a number of variations on the call flow diagram 700 of FIG. 7. As indicated previously, some embodiments may enable the mobile device to calculate the size of the search window for a remote antenna. In such instances, the mobile device may store information that can be used to determine the search window, such as antenna location information, predetermined calculations, and so forth. These embodiments may not utilize an interaction between the mobile device 105 and the positioning server 160 because the mobile device 105 would be capable of determining the size of the search window without information from the positioning server 160. Alternatively, where embodiments utilize an exchange of information between the mobile device 105 and the positioning server 160 (such as the call flow 700 of FIG. 7), the positioning server 160 may provide the search window information (and/or other positioning information) as part of a position assistance protocol.

Figure 8:
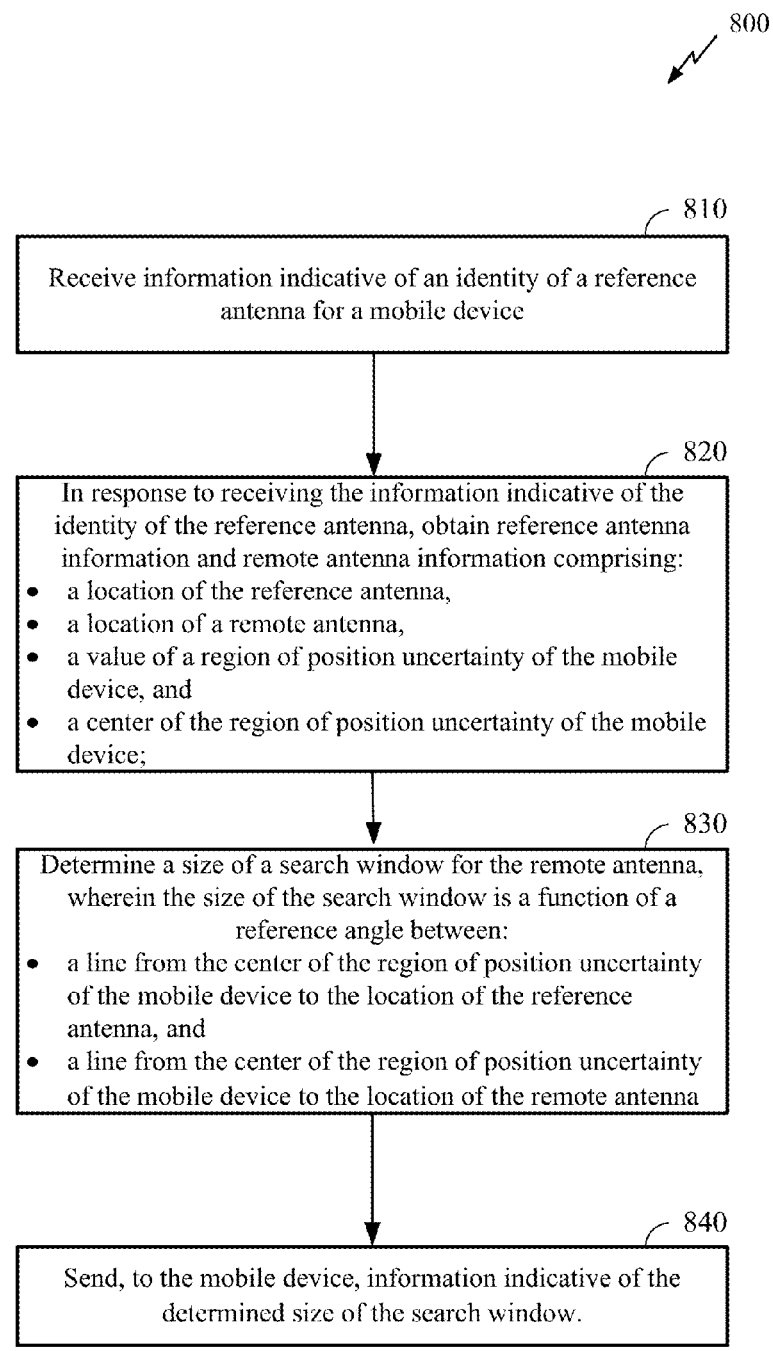
FIG. 8 is a process flow diagram that illustrates a method of providing search window for mobile device positioning, according to one embodiment.

FIG. 8 is a process flow diagram that illustrates a method 800 of providing a search window for mobile device positioning, according to one embodiment. One or more blocks of the method 800 can be performed by a server, such as the positioning server 160 of FIGS. 1 and 7, for example. Particular means for performing the illustrated blocks can be performed by hardware and/or software components of a computer system, such as the example computer system illustrated in FIG. 11 and described in further detail below. Additionally, as with other figures provided herein, FIG. 8 is provided as an example. Other embodiments of the invention may perform similar methods in different manners, by, for example, adding, omitting, combining, separating, rearranging, and/or otherwise altering the blocks illustrated in FIG. 8. A person of ordinary skill in the art will recognize many variations.

The functionality at block 810 comprises receiving information indicative of an identity of a reference antenna for a mobile device. As indicated previously, such information can include the BSID or other identifier of a serving or other cell that can be used as a reference antenna in determining the size of a search window. And as indicated in FIG. 7, this information can be obtained from the mobile device, which may send this information to the positioning server.

Figure 11:
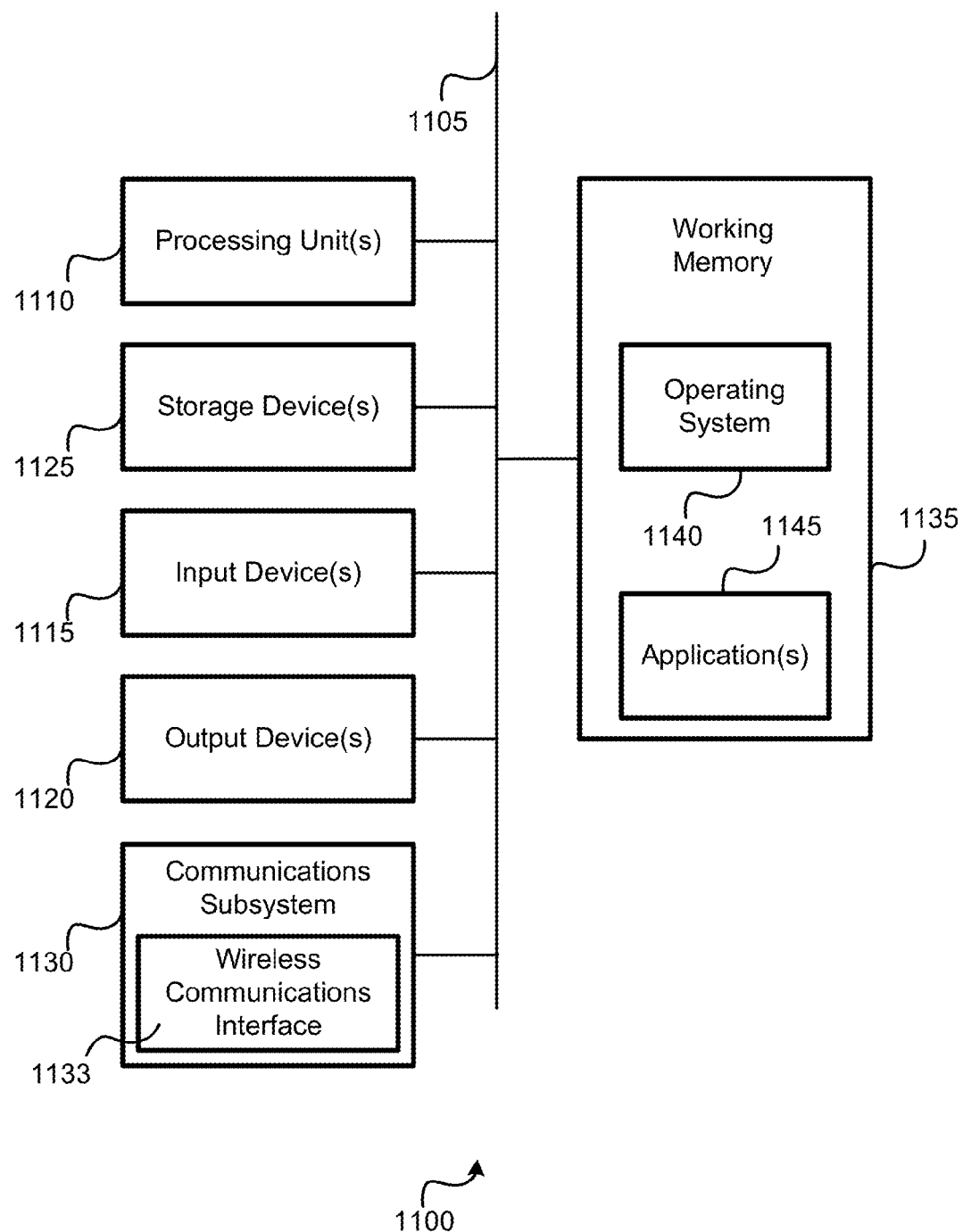
FIG. 11 is a block diagram of an embodiment of a computer system.

Means for performing the functionality of block 810 may comprise, for example, the processing unit(s) 1110, storage device(s) 1125, working memory 1135, and/or communications subsystem 1130, as shown in FIG. 11 and described in further detail below. For example, the processing unit(s) 1110 can be configured to cause information received via the communications subsystem 1130 from a mobile device to be routed to and/or stored in storage device(s) 1125 and/or working memory 1135.

The functionality at block 820 comprises, in response to receiving the information indicative of the identity of the reference antenna (at block 810), obtain reference antenna information and remote antenna information. In some embodiments, this may comprise obtaining location information comprising a location of the reference antenna, a location of a remote antenna, and a center of the region of position uncertainty of the mobile device (e.g., center C of FIG. 2A). As detailed in the embodiments described previously, the size of the region of uncertainty (e.g., Punc or P, as described above) may also be obtained. This information can, for example, be stored in memory (e.g., in a database or other data structure), and looked up by means of the identity of the reference antenna. For example, antenna location and a corresponding center of the region of position uncertainty and/or sizes of the region of uncertainty for each antenna in a cellular network may be stored by the server (or a storage device to which the server has access) and utilized as provided in the techniques herein to determine search window size.

Means for performing the functionality of block 820 may comprise, for example, the processing unit(s) 1110, storage device(s) 1125, working memory 1135, and/or application(s) 1145, as shown in FIG. 11 and described in further detail below. For example, the processing unit(s) 1110 can be configured to obtain the location information from storage device(s) 1125 by executing an algorithm in accordance with an application 1145 in working memory 1135.

At block 830, the size of the search window for the remote antenna is determined. The size of the search window is a function of the reference antenna information and the remote antenna information. In some embodiments, this information may comprise a reference angle between a line from the center of the region of position uncertainty of the mobile device to the location of the reference antenna, and a line from the center of the region of position uncertainty of the mobile device to the location of the remote antenna. The search window can be determined, for example, using the algorithms described above in regards to FIGS. 4A-6. And as described in the embodiments above, the reference angle (or angle, A) can largely determine the size of the search window.

As shown in the embodiments above, this determination can be made in a variety of ways, depending on desired functionality. In some embodiments, for example, the size of the search window for the remote antenna may be determined by determining a difference between a first plurality of values and a second plurality of values, where the first plurality of values correspond to a relationship between the location of the region of position uncertainty of the mobile device and the location of the reference antenna (e.g., OD/P values of the reference antenna), and the second plurality of values correspond to a relationship between the location of the region of position uncertainty of the mobile device and the location of the remote antenna (e.g., OD/P values of the remote antenna). In some embodiments, the first plurality of values and/or the second plurality of values may be calculated in response to obtaining the location information (e.g., on the fly). In some embodiments, reference values (e.g., calculated LOP and/or OD/P values, etc.) may be stored in memory, and the first plurality of values and/or the second plurality of values can be extracted from these reference values in response to obtaining the location information. In some embodiments, a plurality of predetermined values for search windows sizes can be stored in memory as a function of reference angle. In such embodiments, the reference angle can be calculated and the size of the search window for the remote antenna can be determined by identifying a value of the search windows size based on the reference angle.

Means for performing the functionality of block 830 may comprise, for example, the processing unit(s) 1110, storage device(s) 1125, working memory 1135, and/or communications subsystem 1130, as shown in FIG. 11 and described in further detail below. For example, the processing unit(s) 1110 can be configured to obtain reference values storage device(s) 1125 and/or calculate the size of the search window by executing an algorithm in accordance with an application 1145 in working memory 1135.

The functionality at block 840 comprises, sending information indicative of the determined size of the search window to the mobile device. As mentioned previously, this can include information such as the center of the search window and the width of the search window. Other assistance data may be provided by the server in accordance with governing protocols. The governing protocols may be dictated by the technologies involved. As indicated previously, the remote antenna may comprise an LTE cell antenna in some embodiments. In some embodiments, the remote antenna may comprise an antenna of a GNSS SV.

Means for performing the functionality of block 840 may comprise, for example, the processing unit(s) 1110, storage device(s) 1125, working memory 1135, and/or communications subsystem 1130, as shown in FIG. 11 and described in further detail below. For example, the processing unit(s) 1110 can be configured to cause the information indicative of the determined size of the search window to be sent via the communications subsystem 1130 by executing an algorithm in accordance with an application 1145 in working memory 1135.

Figure 9:
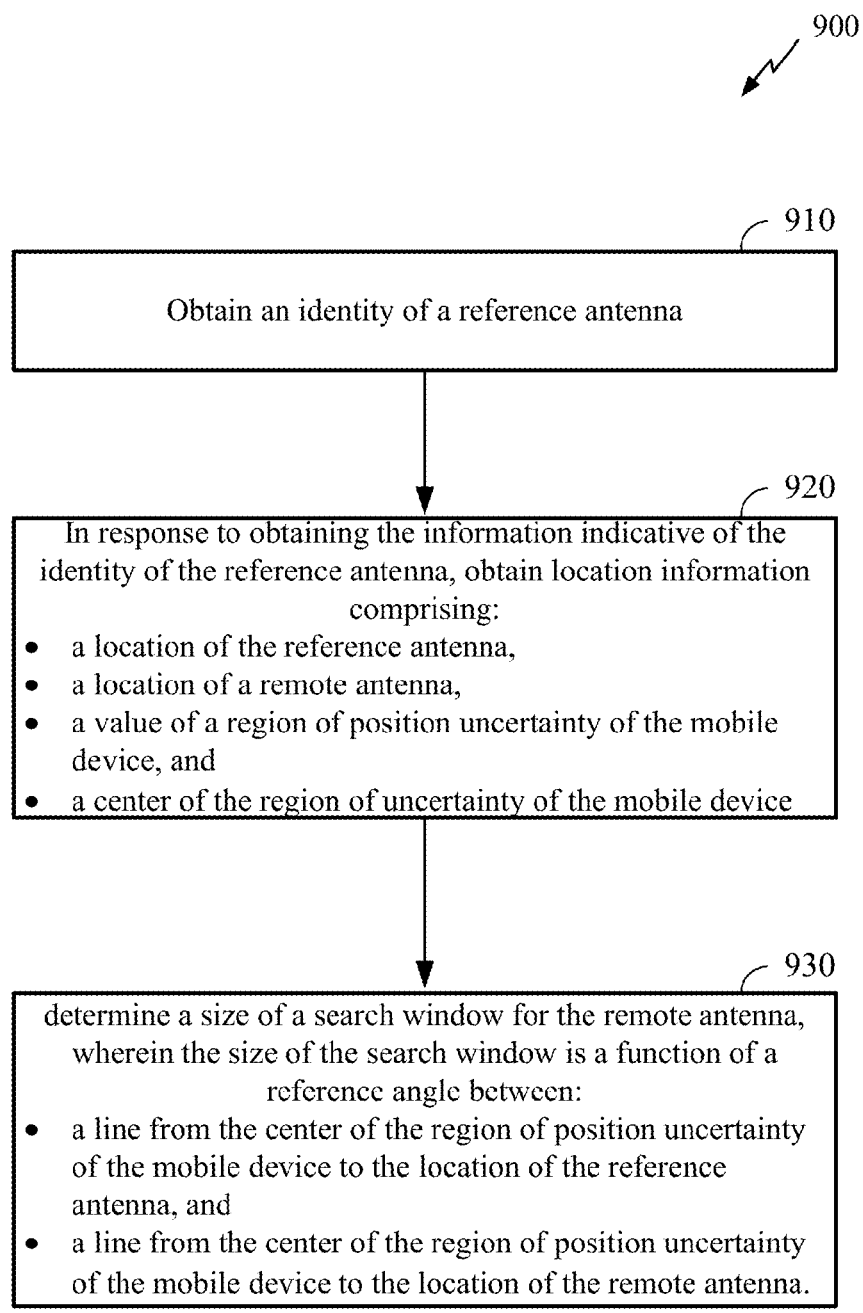
FIG. 9 is a process flow diagram that illustrates a method of determining a search window for mobile device positioning, according to one embodiment.

FIG. 9 is a process flow diagram that illustrates a method 900 of determining a search window for a remote antenna, used in mobile device positioning, according to one embodiment. One or more blocks of the method 900 can be performed by a mobile device, such as the mobile device 105 of FIGS. 1 and 7, for example. Particular means for performing the illustrated blocks can be performed by hardware and/or software components of a mobile device 105, such as the components illustrated in FIG. 10 and described in further detail below. Additionally, as with other figures provided herein, FIG. 9 is provided as an example. Other embodiments of the invention may perform similar methods in different manners, by, for example, adding, omitting, combining, separating, rearranging, and/or otherwise altering the blocks illustrated in FIG. 9. A person of ordinary skill in the art will recognize many variations.

The functionality at block 910 comprises obtaining an identity of the reference antenna. As described with regard to the method 900 of FIG. 9, such information can include the BSID or other identifier of a serving (or other cell) that can be used as a reference antenna in determining the size of a search window. Depending on the wireless technology used by the mobile device and reference antenna, this information may be obtained via a handshake between the mobile device and the reference antenna or other protocol-governed methodologies.

Figure 10:
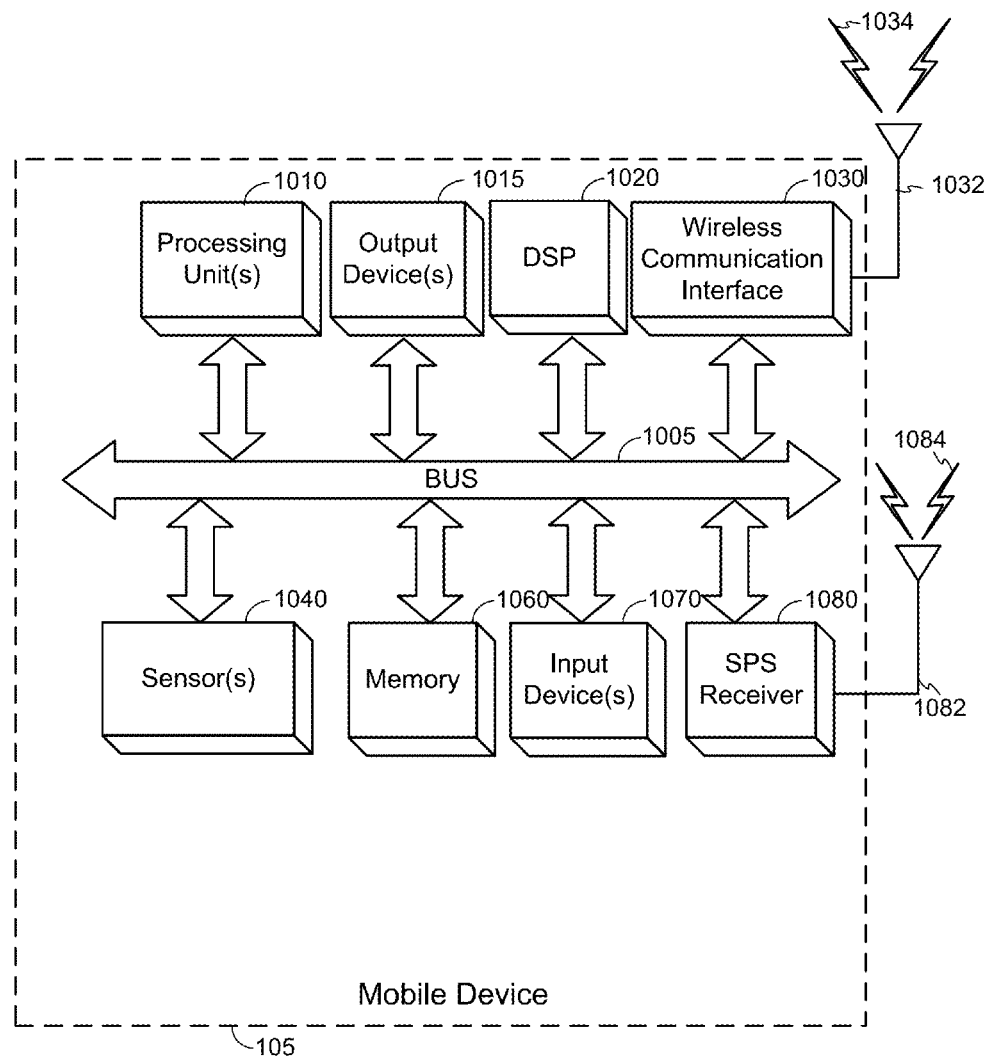
FIG. 10 is a block diagram of an embodiment of a mobile device.

Means for performing the functionality of block 910 may comprise, for example, the processing unit(s) 1010, bus 1005, memory 1060, wireless communication interface 1030 and/or antenna 1032, as shown in FIG. 10 and described in further detail below. For example, the processing unit(s) 1010 can be configured to cause the via the wireless communication interface 1030 to obtain an identity of the reference antenna via standard communication protocol.

At block 920, in response to obtaining the information indicative of the identity of the reference antenna, obtain reference antenna information and remote antenna information. In some embodiments, this information may comprise a location of the reference antenna, a location of a remote antenna, a value (e.g., of a radius, width, or other indication of a size) of a region of position uncertainty of the mobile device, and a center of a region of position uncertainty of the mobile device. Here the functionality echoes the functionality previously described with regard to block 820 of FIG. 8, and the different aspects of the location information may be obtained in the same manner. Here, however, rather than store the location information in the memory of (or accessible to) a server, the location information may be stored locally at the device. For example, according to some embodiments, a mobile device may locally store an almanac that comprises information regarding antennas (e.g., of a cellular network), such as their locations, serving areas, and/or corresponding regions of the uncertainty for mobile devices served by the antennas.

Means for performing the functionality of block 920 may comprise, for example, the processing unit(s) 1010, bus 1005, and/or memory 1060, as shown in FIG. 10 and described in further detail below. For example, the processing unit(s) 1010 can be configured to obtain the information in block 920 from memory 1060 by executing an algorithm in accordance with an application (which may also be stored in memory 1060).

At block 930, a size of a search window for the remote antenna is determined. The size of the search window is a function of the reference antenna information and the remote antenna information. In some embodiments, this information may comprise a reference angle between a line from the center of the region of position uncertainty of the mobile device to the location of the reference antenna, and a line from the center of the region of position uncertainty of the mobile device to the location of the remote antenna. The functionality at block 930 is similar to the functionality described in relation to block 930 of FIG. 9. However, again, the functionality of block 930 may be executed by the mobile device, rather than a server. With the size of the search window for the remote antenna determined, the mobile device may then perform the search.

Means for performing the functionality of block 930 may comprise, for example, the processing unit(s) 1010, bus 1005, and/or memory 1060, as shown in FIG. 10 and described in further detail below. For example, the processing unit(s) 1010 can be configured to obtain values from memory 1060 and/or perform calculations by executing an algorithm in accordance with an application stored in memory 1060.

FIG. 10 illustrates an embodiment of a mobile device 105, which can be utilized as described herein above. For example, the mobile device 105 can be used in the positioning system 100 of FIG. 1, provide reference antenna information, and/or calculate a search window as described in reference to FIGS. 3-10 above. It should be noted that FIG. 10 is meant only to provide a generalized illustration of various components, any or all of which may be utilized as appropriate. It can be noted that, in some instances, components illustrated by FIG. 10 can be localized to a single physical device and/or distributed among various networked devices, which may be disposed at different physical locations.

The mobile device 105 is shown comprising hardware elements that can be electrically coupled via a bus 1005 (or may otherwise be in communication, as appropriate). The hardware elements may include a processing unit(s) 1010 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 10, some embodiments may have a separate DSP 1020, depending on desired functionality. The mobile device 105 also may comprise one or more input devices 1070, which may comprise without limitation one or more touch screens, touch pads, microphones, buttons, dials, switches, and/or the like; and one or more output devices 1015, which may comprise without limitation, one or more displays, light emitting diodes (LEDs), speakers, and/or the like.

The mobile device 105 might also include a wireless communication interface 1030, which may comprise without limitation a modem, a network card, an infrared communication device, a wireless communication device, and/or a chipset (such as a Bluetooth™ device, an IEEE 802.11 device, an IEEE 802.15.4 device, a Wi-Fi device, a WiMAX device, cellular communication circuitry, etc.), and/or the like. The wireless communication interface 1030 may permit data (such as reference antenna, search window, and other information as described in the embodiments herein) to be communicated with a network, wireless access points, other computer systems, and/or any other electronic devices described herein, such as the mobile network provider 140, Internet 150, and/or other networks described in relation to FIG. 1. The communication can be carried out via one or more wireless communication antenna(s) 1032 that send and/or receive wireless signals 1034.

Depending on desired functionality, the wireless communication interface 1030 may comprise separate transceivers to communicate with base transceiver stations (e.g., antenna 120) and other wireless devices and access points. As indicated previously with respect to FIG. 1, these different data networks may comprise various network types. Additionally, a WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A WLAN may also be an IEEE 802.11x network, and a WPAN may be a Bluetooth network, an IEEE 802.15x, or some other type of network. The techniques described herein may also be used for any combination of WWAN, WLAN and/or WPAN.

The mobile device 105 can further include sensor(s) 1040. Such sensors may comprise, without limitation, one or more accelerometer(s), gyroscope(s), camera(s), magnetometer(s), altimeter(s), microphone(s), proximity sensor(s), light sensor(s), and the like. Some or all of the sensor(s) 1040 can be utilized, among other things, for dead reckoning and/or other positioning methods, which may be used, in some embodiments, to complement the positioning features described herein.

Embodiments of the mobile device may also include GNSS receiver 1080 capable of receiving signals 1084 from one or more GNSS SVs (such as GNSS SVs 110, of FIG. 1) using an GNSS antenna 1082. Such positioning can be utilized to complement and/or incorporate the techniques described herein. The GNSS receiver 1080 can extract a position of the mobile device, using conventional techniques, from GNSS SVs of an GNSS system, such as Galileo, GLONASS, Compass, Quasi-Zenith Satellite System (QZSS) over Japan, Indian Regional Navigational Satellite System (IRNSS) over India, Beidou over China, and/or the like. Moreover, the GNSS receiver 1080 can be used various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an GNSS may include any combination of one or more global and/or regional navigation satellite systems and/or augmentation systems, and GNSS signals may include GNSS, GNSS-like, and/or other signals associated with such one or more GNSS.

The mobile device 105 may further include and/or be in communication with a memory 1060. The memory 1060 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 1060 of the mobile device 105 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as code and/or instructions executable by the mobile device 105 (and/or a processing unit within a mobile device 105, and/or another device of a positioning system). In an aspect, then, such code and/or instructions can be used to configure and/or adapt a general purpose computer (or other device) to perform one or more operations in accordance with the described methods.

FIG. 11 illustrates an embodiment of a computer system 1100, which may be incorporated, at least in part, into devices such as the one or more positioning servers 160 as described in FIGS. 1 and 7-9, and/or a computing device incorporated and/or communicatively connected therewith, as described herein. FIG. 11 provides a schematic illustration of one embodiment of a computer system 1100 that can perform the methods provided by various other embodiments, such as the method described in relation to FIG. 8. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner. In addition, it can be noted that components illustrated by FIG. 11 can be localized to a single device and/or distributed among various networked devices, which may be disposed at different physical locations.

The computer system 1100 is shown comprising hardware elements that can be electrically coupled via a bus 1105 (or may otherwise be in communication, as appropriate). The hardware elements may include processing unit(s) 1110, which may comprise without limitation one or more general-purpose processors, one or more special-purpose processors (such as digital signal processing chips, graphics acceleration processors, and/or the like), and/or other processing structure, which can be configured to perform one or more of the methods described herein, including the methods described in relation to FIGS. 7-9. The computer system 1100 also may comprise one or more input devices 1115, which may comprise without limitation a mouse, a keyboard, a camera, a microphone, and/or the like; and one or more output devices 1120, which may comprise without limitation a display device, a printer, and/or the like.

The computer system 1100 may further include (and/or be in communication with) one or more non-transitory storage devices 1125, which can comprise, without limitation, local and/or network accessible storage, and/or may comprise, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1100 might also include a communications subsystem 1130, which may comprise wireless communication technologies managed and controlled by a wireless communication interface 1133, as well as wired technologies. As such, the communications subsystem may comprise a modem, a network card (wireless or wired), an infrared communication device, a wireless communication device, and/or a chipset (such as a Bluetooth™ device, an IEEE 802.11 device, an IEEE 802.15.4 device, a Wi-Fi device, a WiMAX device, cellular communication facilities, UWB interface, etc.), and/or the like. The communications subsystem 1130 may include one or more input and/or output communication interfaces, such as the wireless communication interface 1133, to permit data to be exchanged with a network, mobile devices (such as the mobile device 105 of FIGS. 1-10), other computer systems, and/or any other electronic devices described herein. Hence, the communications subsystem 1130 may be used to receive and send data (e.g., location data, and almanac, etc.) as described in the embodiments herein.

In many embodiments, the computer system 1100 will further comprise a working memory 1135, which may comprise a RAM or ROM device, as described above. Software elements, shown as being located within the working memory 1135, may comprise an operating system 1140, device drivers, executable libraries, and/or other code, such as one or more applications 1145, which may comprise computer programs provided by various embodiments, and/or may be designed to implement methods, and/or configure systems, provided by other embodiments, as described herein. Merely by way of example, one or more procedures described with respect to the method(s) discussed above, such as the methods described in relation to FIGS. 7-9, might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods. For example, the computer system 1100 and software elements can be used to build and maintain a database and/or other data structure of antenna information (e.g., an almanac) as described herein. These approximate locations and/or coverage regions can be determined and/or updated, and propagated to one or more positioning servers, mobile devices, or other electronic devices.

A set of these instructions and/or code might be stored on a non-transitory computer-readable storage medium, such as the storage device(s) 1125 described above. In some cases, the storage medium might be incorporated within a computer system, such as computer system 1100. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1100 and/or might take the form of source and/or installable code, which, upon compilation and/or installation on the computer system 1100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that may comprise memory may comprise non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A server for providing a search window for a remote antenna, used in mobile device positioning, the server comprising:
   a communication interface;
   a memory; and
   a processing unit communicatively coupled with the communication interface and the memory, the processing unit configured to cause the server to:
   receive, via the communication interface, information indicative of an identity of a reference antenna for a mobile device;
   in response to receiving the information indicative of the identity of the reference antenna, obtain reference antenna information and remote antenna information;
   determine a size of the search window for the remote antenna, wherein the size of the search window for the remote antenna is a function of the reference antenna information and the remote antenna information; and
   send, via the communication interface to the mobile device, information indicative of the determined size of the search window for the remote antenna.

2. The server of claim 1, wherein the processing unit is configured to cause the server to obtain the reference antenna information and the remote antenna information comprising:
   a location of the reference antenna,
   a location of the remote antenna, and
   a region of position uncertainty of the mobile device.

3. The server of claim 1, wherein the processing unit is configured to cause the server to determine the size of the search window for the remote antenna as a function of a reference angle between:
   a line from a center of a region of position uncertainty of the mobile device to a location of the reference antenna, and a line from the center of the region of position uncertainty of the mobile device to a location of the remote antenna.

4. The server of claim 3, wherein:
   the memory is configured to store a plurality of predetermined values for search windows sizes; and
   the processing unit is configured to:
   calculate the reference angle, and
   determine the size of the search window for the remote antenna by identifying a value from the plurality of predetermined values for search window sizes based on the reference angle.

5. The server of claim 1, wherein the processing unit is configured to cause the server to determine the size of the search window for the remote antenna by determining a difference between a first plurality of values and a second plurality of values, wherein:
   the first plurality of values corresponds to a relationship between a location of a region of position uncertainty of the mobile device and a location of the reference antenna, and
   the second plurality of values corresponds to a relationship between the location of the region of position uncertainty of the mobile device and the location of the remote antenna.

6. The server of claim 5, wherein the processing unit is configured to cause the server to calculate the first plurality of values, the second plurality of values, or any combination thereof, in response to obtaining the reference antenna information and the remote antenna information.

7. The server of claim 5, wherein:
   the memory is configured to store a plurality of reference values; and
   the processing unit is configured to extract the first plurality of values, the second plurality of values, or any combination thereof, from the plurality of reference values in response to obtaining the reference antenna information and the remote antenna information.

8. The server of claim 1, wherein the processing unit is configured to obtain a location of the remote antenna, wherein the remote antenna comprises at least one of a Long-Term Evolution (LTE) cell antenna, a Code Division Multiple Access (CDMA), a Wideband Code Division Multiple Access (WCDMA) antenna, or any combination thereof.

9. The server of claim 1, wherein the processing unit is configured to obtain a location of the remote antenna, wherein the remote antenna comprises a Global Navigation Satellite System (GNSS) satellite vehicle antenna.

10. The server of claim 1, wherein the processing unit is configured to obtain a location of the reference antenna, a location of the remote antenna, or any combination thereof from a database stored in the memory.

11. The server of claim 1, wherein the reference antenna information comprises the distance from a center of a region of position uncertainty of the mobile device to a location of the reference antenna divided by a radius of the region of position uncertainty of the mobile device, and the remote antenna information comprises the distance from the center of the region of position uncertainty of the mobile device to a location of the remote antenna to the region of uncertainty divided by the radius of the region of position uncertainty of the mobile device.

12. A mobile device comprising:
a communication interface;
a memory; and
a processing unit communicatively coupled with the communication interface and the memory, the processing unit configured to cause the mobile device to:
obtain, via the communication interface, an identity of a reference antenna;
in response to obtaining the information indicative of the identity of the reference antenna, obtain reference antenna information and remote antenna information;
determine a size of a search window for a remote antenna, wherein the size of the search window for the remote antenna is a function of the reference antenna information and the remote antenna information.

13. The mobile device of claim 12, wherein the processing unit is configured to cause the mobile device to obtain the reference antenna information and the remote antenna information comprising:
a location of the reference antenna,
a location of the remote antenna,
a value of a region of position uncertainty of the mobile device, and
a center of the region of position uncertainty of the mobile device.

14. The mobile device of claim 12, wherein the processing unit is configured to cause the mobile device to determine the size of the search window for the remote antenna as a function of a reference angle between:
a line from a center of a region of position uncertainty of the mobile device to a location of the reference antenna, and
a line from the center of the region of position uncertainty of the mobile device to a location of the remote antenna.

15. The mobile device of claim 14, wherein:
the memory is configured to store a plurality of predetermined values for search windows sizes; and
the processing unit is configured to:
calculate the reference angle, and
determine the size of the search window for the remote antenna by identifying a value from the plurality of predetermined values for search window sizes based on the reference angle.

16. The mobile device of claim 12, wherein the processing unit is configured to cause the mobile device to determine the size of the search window for the remote antenna by determining a difference between a first plurality of values and a second plurality of values, wherein:
the first plurality of values corresponds to a relationship between a location of a region of position uncertainty of the mobile device and a location of the reference antenna, and
the second plurality of values corresponds to a relationship between the location of the region of position uncertainty of the mobile device and the location of the remote antenna.

17. The mobile device of claim 16, wherein the processing unit is configured to cause the mobile device to calculate the first plurality of values, the second plurality of values, or any combination thereof, in response to obtaining the reference antenna information and the remote antenna information.

18. The mobile device of claim 16, wherein:
the memory is configured to store a plurality of reference values; and
the processing unit is configured to extract the first plurality of values, the second plurality of values, or any combination thereof, from the plurality of reference values in response to obtaining the reference antenna information and the remote antenna information.

19. The mobile device of claim 12, wherein the processing unit is configured to obtain the reference antenna information and the remote antenna information, wherein the remote antenna comprises a Long-Term Evolution (LTE) cell antenna.

20. The mobile device of claim 12, wherein the processing unit is configured to obtain the reference antenna information and the remote antenna information, wherein the remote antenna comprises a Global Navigation Satellite System (GNSS) satellite vehicle antenna.

21. The mobile device of claim 12, wherein the reference antenna information comprises the distance from a center of a region of position uncertainty of the mobile device to a location of the reference antenna divided by a radius of the region of position uncertainty of the mobile device, and the remote antenna information comprises the distance from the center of the region of position uncertainty of the mobile device to a location of the remote antenna to the region of uncertainty divided by the radius of the region of position uncertainty of the mobile device.

22. A method of providing a search window for a remote antenna, used in mobile device positioning, the method comprising:
receiving, via a communication interface, information indicative of an identity of a reference antenna for a mobile device;
in response to receiving the information indicative of the identity of the reference antenna, obtaining reference antenna information and remote antenna information;
determining, with a processing unit, a size of the search window for the remote antenna, wherein the size of the search window for the remote antenna is a function of the reference antenna information and the remote antenna information; and
sending, via the communication interface to the mobile device, information indicative of the determined size of the search window for the remote antenna.

23. The method of claim 22, wherein obtaining the reference antenna information and the remote antenna information comprises:
a location of the reference antenna,
a location of the remote antenna, and
a region of position uncertainty of the mobile device.

24. The method of claim 22, further comprising determining the size of the search window for the remote antenna as a function of a reference angle between:
a line from a center of a region of position uncertainty of the mobile device to a location of the reference antenna, and a line from the center of the region of position uncertainty of the mobile device to a location of the remote antenna.

25. The method of claim 24, further comprising:
storing a plurality of predetermined values for search windows sizes; and
calculating the reference angle, and determining the size of the search window for the remote antenna by identifying a value from the plurality of predetermined values for search window sizes based on the reference angle.

26. A method of determining a search window for a remote antenna, used in mobile device positioning comprising:
- obtaining, via a communication interface, an identity of a reference antenna;
- in response to obtaining the information indicative of the identity of the reference antenna, obtaining reference antenna information and remote antenna information;
- determining, with a processing unit, a size of the search window for the remote antenna, wherein the size of the search window for the remote antenna is a function of the reference antenna information and the remote antenna information.

27. The method of claim 26, wherein the reference antenna information and the remote antenna information comprises:
- a location of the reference antenna,
- a location of the remote antenna,
- a value of a region of position uncertainty of a mobile device, and
- a center of the region of position uncertainty of the mobile device.

28. The method of claim 26, further comprising determining the size of the search window for the remote antenna as a function of a reference angle between:
- a line from a center of a region of position uncertainty of a mobile device to a location of the reference antenna, and
- a line from the center of the region of position uncertainty of the mobile device to a location of the remote antenna.

29. The method of claim 26, wherein determining the size of the search window for the remote antenna comprises determining a difference between a first plurality of values and a second plurality of values, wherein:
- the first plurality of values corresponds to a relationship between a location of a region of position uncertainty of a mobile device and a location of the reference antenna, and
- the second plurality of values corresponds to a relationship between the location of the region of position uncertainty of the mobile device and the location of the remote antenna.

30. The method of claim 29, further comprising calculating the first plurality of values, the second plurality of values, or any combination thereof, in response to obtaining the reference antenna information and the remote antenna information.

* * * * *